United States Patent [19]
Foucher et al.

[11] Patent Number: 5,744,560
[45] Date of Patent: Apr. 28, 1998

[54] METAL ACCELERATED POLYMERIZATION PROCESSES

[75] Inventors: Daniel A. Foucher, Toronto; Paula J. MacLeod, Mississauga; Michael K. Georges, Guelph; Timothy E. Burrow, Toronto, all of Canada

[73] Assignee: Xerox Corporation, Stamford, Conn.

[21] Appl. No.: 784,638

[22] Filed: Jan. 21, 1997

[51] Int. Cl.$^6$ ............................. C08F 4/10; C08F 4/50; C08F 4/80; C08F 12/08

[52] U.S. Cl. .................. 526/221; 526/79; 526/81; 526/86; 526/87; 526/90; 526/91; 526/93; 526/126; 526/131; 526/135; 526/147; 526/172; 526/183; 526/184; 526/190; 526/192; 526/193; 526/194; 526/195; 526/204; 526/217; 526/219; 526/212.2; 526/220; 526/227; 526/226; 526/230.5; 526/329.2; 526/346; 525/244; 525/245; 525/247; 525/254; 525/259; 525/266

[58] Field of Search ......................... 526/183, 126, 526/131, 135, 147, 170, 171, 184, 190, 192, 204, 219, 220, 221, 86, 90, 91, 93, 172, 193, 194, 195, 219.2, 226, 230.5, 79, 81, 244, 245, 247, 254, 259, 266

[56] References Cited

U.S. PATENT DOCUMENTS

| | | | |
|---|---|---|---|
| 3,855,040 | 12/1974 | Malofsky | 156/310 |
| 4,076,742 | 2/1978 | Berlin et al. | 260/47 UA |
| 4,513,127 | 4/1985 | Jacobine | 526/194 |
| 4,525,553 | 6/1985 | Rooney et al. | 526/120 |
| 4,581,429 | 4/1986 | Solomon et al. | 526/220 |
| 5,312,871 | 5/1994 | Mardare et al. | 526/184 X |
| 5,322,912 | 6/1994 | Georges et al. | 526/204 |
| 5,401,801 | 3/1995 | Nagamawa et al. | 524/745 |
| 5,412,047 | 5/1995 | Georges et al. | 526/204 |
| 5,610,249 | 3/1997 | Ogawa | 526/204 X |

OTHER PUBLICATIONS

Concise Chemical and Technical Dictionary, 1974, Chem. Publishing Co., N.Y., p. 1058.
Gaynor et al., Controlled Radical Polymerization, J.M.S.–Pure Appl. Chem., A31(11), 1561–1578 (1994).
A.V. Trubnikov et al., "Inhibition of Polymerization of Vinyl Monomers Using Nitride and Iminoxide Radicals", Synthetic High Polymers, vol. 90, 1979.
A.V. Trubnikov et al., "Effect of Stable Radicals on Styrene Polymerization", Synthetic High Polymers, vol. 85, 1976.
M.D. Goldfein et al., "Inhibition of Styrene Polymerization by Stable Radical 4.4'–diethoxydiphenylnitroxide", Synthetic High Polymers, vol. 81, 1974.
M.D. Goldfein et al., "Effect of Free Stable Radicals on the Kinetics and Mechanism of Polymerization of Certain Vinyl Monomers", Chemical Abstracts, vol. 83, 1975.
A.V. Trubnikov et al., "Mechanism of Inhibition of Polymerization of Vinyl Monomers by Stable Radicals", Synthetic High Polymers, vol. 86, 1977.
G. Moud et al., "Reactions of Benzoyloxyl Radicals With Some Common Vinyl Monomers", Makromol. Chem., Rapid Commun. 3, pp. 533–536 (1982).
E. Rizzardo et al., "A New Method for Investigating the Mechanism of Initiation of Radical Polymerization",Polymer Bulletin 1, pp. 529–534 (1979).

Primary Examiner—Fred Teskin
Attorney, Agent, or Firm—E. O. Palazzo

[57] ABSTRACT

A free radical polymerization process for the preparation of a polymer comprising heating a mixture of a free radical initiator, a stable free radical agent, a metal catalyst, or a metal stable free radical complex catalyst, and at least one polymerizable monomer; cooling said mixture; and optionally isolating said polymer.

22 Claims, No Drawings

METAL ACCELERATED POLYMERIZATION PROCESSES

Illustrated in U.S. Pat. No. 5,412,047, the disclosure of which is totally incorporated herein by reference, is a polymerization process for the preparation of homopolymeric acrylates containing thermoplastic resin or resins comprising heating at, for example, from about 100° C. to about 160° C., a mixture comprised of a free radical initiator, an oxo nitroxide stable free radical agent, at least one polymerizable acrylate monomer compound, and optionally a solvent, to form a homopolymeric acrylate containing thermoplastic resin or resins with a high monomer to polymer conversion and a narrow polydispersity.

Illustrated in copending application U.S. Ser. No. 348, 021, the disclosure of which is totally incorporated herein by reference, is a free radical polymerization process for the preparation of thermoplastic resin comprising heating a mixture of a free radical initiator, a stable free radical agent, and at least one polymerizable monomer compound, and wherein said heating is accomplished at a temperature of from about 40 to about 100° C. in the presence of ultrasonic irradiation; cooling said mixture; and optionally isolating said thermoplastic resin, and washing and drying said thermoplastic resin.

Illustrated in copending application U.S. Ser. No. 700, 328, the disclosure of which is totally incorporated herein by reference, is a free radical polymerization process for the preparation of a thermoplastic resin or resins comprising heating a mixture of a free radical initiator, a stable free radical agent, and at least one polymerizable monomer compound to form said thermoplastic resin or resins with a high monomer to polymer conversion; cooling said mixture; optionally isolating said thermoplastic resin or resins; and optionally washing and drying said thermoplastic resin or resins.

Illustrated in copending application U.S. Ser. No. 784, 633, the disclosure of which is totally incorporated herein by reference, is a free radical polymerization process for the preparation of a polymer comprising heating a mixture of a free radical initiator, a stable free radical agent, a transition metal compound catalyst, and at least one polymerizable monomer; cooling said mixture; and optionally isolating the polymer.

Also of interest are commonly owned and assigned U.S. Pat. No. 5,401,801, U.S. Pat. No. 5,322,912, U.S. Ser. No. 08/214,518, and U.S. Ser. No. 08/223,418, the disclosures of each of which are totally incorporated herein by reference. The Pat. No. 5,322,912 patent illustrates a stable free radical polymerization process, and wherein a transition metal catalyst compound is not selected. With the present invention, the catalyst is of importance in that, for example, it enables an acceleration of the polymerization while enabling excellent polymer product narrow polydispersities.

BACKGROUND OF THE INVENTION

The present invention relates to processes for the preparation of polymers, including copolymers, and more specifically, to polymerization processes and polymers thereof. In embodiments, the present invention relates to a stable free radical moderated process for generating a thermoplastic polymer resin or resins that have narrow polydispersities, that is, narrow molecular weight distributions as illustrated, for example, by the ratio $M_w:M_n$, where $M_w$ is weight average molecular weight and $M_n$ is number average molecular weight, and easily controllable modality, from at least one monomer compound comprising heating for an effective period of time a mixture of a free radical initiator, a stable free radical agent, and at least one polymerizable monomer in the presence of a metal or metal complex, especially metal stable free radical complexes, such as metal TEMPO complexes, and under conditions to enable substantially all polymer chain formations to be initiated at about the same time; cooling the mixture to effectively terminate the polymerization; isolating the thermoplastic resin product; and optionally washing and drying the polymer product. The polymer resins generated by the process of the present invention in embodiments are essentially monomodal and in embodiments by repeating the heating step, that is, the combined initiation and polymerization step, there is provided a method for obtaining mixtures of monomodal polymer resins that are compositionally the same resin type having characteristics of both narrow polydispersity and selectable modality.

The processes of the present invention, in embodiments, provides for high monomer to polymer conversion rates, or degrees of polymerization, for example of 90 percent by weight or greater, and more specifically, from about 90 to about 99 percent. Also, the processes of the present invention, in embodiments, provide for relatively high weight average molecular weights, from weight average molecular weights ranging from about 10,000 to about 500,000, or greater in embodiments.

In embodiments, the process of the present invention can be conducted in bulk or solution neat free radical polymerization on multikilogram or larger scales. The aforementioned embodiments may be accomplished in a one reactor or single pot environment. Moreover, in embodiments the polymeric chain growth proceeds by a pseudoliving mechanism and can provide resins of variable molecular weights, $M_w$, from very low to very high, for example less than about 10,000 up to about 500,000, and more specifically, from about 25,000 to about 300,000 while maintaining narrow molecular weight distributions or polydispersities. Also, in embodiments block copolymers, multiblocks, homopolymers, graft polymers, and the like can be synthesized by the transition metal stable free radical moderated free radical polymerization processes illustrated herein wherein for the block copolymer each block formed is well defined in length by the reacted monomer, and wherein each block formed can possess a narrow molecular weight distribution.

The accelerated stable free radical polymerization processes of the present invention enables polydispersities of between 1.10 and 1.30 for polymers, such as polystyrene, and as low as 1.4 for various copolymers. Also, the accelerated stable free radical polymerization processes of the present invention provide polydispersities that are comparable to those obtained in anionic polymerizations. Moreover, in accordance with the present invention there are provided processes wherein catalysts, including colorless catalysts, wherein the metal is either a transition or rare earth metal, can accelerate the reaction and wherein the transition or rare earth catalysts may function as both the stable free radical source and as the complexing agent for binding the free stable free radical, such as TEMPO, with the stable free radical polymerization process.

The polymerization processes and thermoplastic resin products thereof of the present invention can be selected for a variety of specialty applications including toner resins usable in electrophotographic imaging processes, thermoplastic films and coating technologies, adhesives, rubbers, lubricants, and the like.

PRIOR ART

Of the known polymerization processes, an apparently preferred commercial process for the preparation of polymers or copolymers having a narrow molecular weight distribution or polydispersity is by anionic processes. Accordingly, the use and availability of resins having narrow polydispersities in industrial applications is limited primarily since anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous rendering the anionic process more costly than alternatives which do not have these requirements. Thus, anionic polymerization processes are difficult and costly. It thus would be desirable to provide a free radical polymerization process that would consistently enable narrow molecular weight distribution resins, and that avoid or minimize the disadvantages of the aforementioned anionic polymerization processes.

Copolymers prepared by free radical polymerization processes inherently have broad molecular weight distributions or polydispersities, generally greater than about five since, for example, the free radical initiators selected have half lives that are relatively long, from several minutes to hours, and polymeric chains are not all initiated at the same time, and which initiators provide growing chains of various lengths at any time during the polymerization process. Also, the propagating chains in a free radical process can react with each other in processes known as coupling and disproportionation, both of which are chain terminating reactions, therefore, chains of varying lengths are terminated at different times during the reaction process which results in resins comprised of polymeric chains which vary widely in length from very small to very large. For a free radical polymerization process to be enabled for producing narrow molecular weight distributions, all polymer chains must be initiated at about the same time and premature termination by coupling or disproportionation processes is to be avoided.

Otsu et al., in *Makromol Chem., Rapid Commun.*, 3, 127 (1982), introduced the use of iniferters as a means of producing block copolymers by a free radical polymerization process. A mechanism proposed for the reaction suggested that a pseudoliving propagating free radical chain exists and that it continues to grow with time. There are two major drawbacks associated with using iniferters. Iniferters tend to react very slowly and the percent conversion or degree of polymerization of monomer to polymer is low, for example about 40 percent, even after 20 hours of reaction time. Another drawback is that the free radical trap that caps the end of the growing chain has the ability to initiate new chains at any time during the course of the reaction, see for example, S. R. Turner, R. W. Blevins, in *Polymer Reprints*, 29(2), September 1988. This initiation leads to new chains being initiated at various times during the polymerization and consequently leads to broadening of the polydispersity. Although the approach in the aforementioned reference of Otsu et al. was novel in using pseudoliving free radical propagating chains, it was not believed to be applicable to the synthesis of narrow molecular weight distribution resins particularly for polymers with high molecular weights.

The use of stable free radicals are known as inhibitors of free radical polymerizations, see for example, G. Moad et. al., *Polymer Bulletin* 6, 589 (1982). Studies by, for example, G. Moad et. al. *J. Macromol. Sci.-Chem.*, A17(1), 51(1982) have reported on the use of stable free radicals as inhibitors of free radical polymerizations performed at low temperatures, for example below 90° C., and at low monomer to polymer conversions.

In a hypothetical free radical polymerization of styrene, in which chains are continually initiated over the course of the polymerization, and where chain termination by coupling processes is also occurring, calculations as described in, for example, G. G. Odian, *Principles of Polymerization*, pages 280–281, $2^{nd}$ Ed., John Wiley & Sons, 1981 have shown that the narrowest polydispersity that one can theoretically possibly obtain is 1.5. In practice, polydispersities much greater than 1.5 are actually obtained. Polydispersities of between 2.0 and 2.4 are typical for free radical homopolymerizations of styrene. In the situation with copolymer systems, polydispersities of greater than 4 are generally obtained.

U.S. Pat. No. 4,581,429 discloses a free radical polymerization process which controls the growth of polymer chains to produce short chain or oligomeric homopolymers and copolymers including block and graft copolymers. The process employs an initiator having the formula (in part)= N-O-X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates, employ relatively low reaction temperatures of less than about 100° C., and use multiple stages.

U.S. Pat. No. 5,059,657 discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

In free radical polymerization reaction processes of the prior art, except for the commonly assigned pending applications and patents various significant problems exist, for example difficulties in predicting or controlling the polydispersity and modality of the polymers produced. These free radical polymerization processes invariably produce polymers with high weight average molecular weights ($M_w$) and low number average molecular weights ($M_n$) resulting in broad polydispersities. Further, bulk or neat free radical polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in *Principles of Polymerization*, G. Odian, $2^{nd}$ Ed., Wiley-Interscience, New York, 1981, page 272, the disclosure of which is entirely incorporated herein by reference. Moreover, the exothermic nature of free radical polymerization processes is often a limitation that severely restricts the concentration of reactants or the reactor size upon scale up.

Thus, there remains a need for accelerated processes for the preparation of narrow polydispersity polymeric resins by economical and scaleable free radical polymerization methods and which polymers retain many or all of their desirable physical properties, for example, hardness, low gel content, processability, clarity, high gloss durability, and the like, while avoiding or minimizing the problems of gel formation, exotherms, volume limited and multi-stage reaction systems, purification, performance properties of the polymer resin products, and the like associated with prior art free radical polymerizations. Furthermore, with the economical processes of the present invention the importance of auto-polymerization is reduced, and accordingly, the processes can be accomplished at lower effective temperatures. With the processes of the present invention in embodiments thereof there are selected certain metal complexes as novel catalysts for stable free radical polymerization processes and wherein the catalysts may function as the free radical source and as free radical complexing agents for binding the free stable free radical agent within the stable free radical polymerization process.

SUMMARY OF THE INVENTION

An object of the present invention is to provide stable free radical polymerization processes and polymers that overcome many of the problems and disadvantages of the prior art.

Another object of the present invention is to provided in embodiments, a polymerization process for the preparation of thermoplastic resin or resins comprising heating a mixture comprised of a free radical initiator, a stable free radical agent, at least one polymerizable monomer compound, a rate enhancing metal complex catalyst like metal TEMPO complexes, including wherein the metal is a rare earth metal, to form a thermoplastic resin or resins with a high monomer to polymer conversion and a narrow dispersity.

In another object of the present invention there is to provided a free radical polymerization reaction system which may be conducted in the presence or absence of conventional reaction media.

In yet another object of the present invention there is provided polymerization processes for the preparation of homopolymeric and copolymeric resins with narrow polydispersities in high conversions.

It is also an object of the present invention to provide polymerization processes for the production of diblock and multiblock polymers with high monomer to polymer conversion and a narrow polydispersity.

In yet another object of the instant invention, coupling or disproportionation termination reactions are prevented by reversibly terminating the propagating free radical chains with a stable free radical agent which serves to moderate the free radical polymerization process.

Also, in another object of the present invention there is provided the acceleration of the dissociation of the free radical peroxide initiator by the addition of promoter compounds which include, for example, tertiary amines, which ensure that all polymeric chains are initiated nearly simultaneously or about the same time.

Another object of the present invention resides in the addition to the reaction mixture of small amounts of organic acids, for example sulfonic or carboxylic acids, to the reaction medium to increase the rate of reaction without broadening the polydispersity of the polymeric resins.

Still another object of the present invention is to prepare thermoplastic resins by single pot processes employing a monomer or monomers, a suitable azo or peroxide free radical initiator, and a stable free radical agent.

Another object of the present invention is to prepare resins with accelerated polymerization processes wherein the molecular weight of the growing polymer chains increase over about the entire time period of the polymerization reaction, and wherein the percent conversion or degree of polymerization of monomer to polymer with respect to time or number average molecular weight is approximately linear, that is, polymerization processes which occur without the known Trommsdorff effect.

The present invention relates to forming in an accelerated manner narrow polydispersity polymeric resins by a free radical polymerization process comprising heating a mixture of a metal stable free radical complex, a free radical initiator, a stable free radical agent, and at least one, for example from 1 to about 5, and preferably 1, polymerizable monomer to form thermoplastic resin or resins with a high monomer to polymer conversion, cooling the mixture, optionally isolating the thermoplastic resin or resins, optionally washing and drying the thermoplastic resin or resins, and wherein the thermoplastic resin or resins possess a narrow polydispersity.

Another embodiment of the present invention relates to a free radical polymerization process for the preparation of thermoplastic resins comprising heating a first mixture comprised of a free radical initiator, a stable free radical agent, a metal stable free radical complex catalyst, and which catalyst can function as a stable free radical source and as a stable free radical complexing agent, and at least one and preferably one polymerizable monomer compound to form a first intermediate product resin; optionally cooling the first mixture; adding to the first intermediate product resin a second mixture comprised of a free radical initiator, a stable free radical agent, a metal stable free radical complex, and at least one polymerizable monomer compound, wherein the polymerizable monomer compound of the second mixture is the same as the polymerizable monomer compound of the first mixture, and the free radical initiator and the stable free radical agent of the second mixture are the same or different from the free radical initiator and the stable free radical agent of the first mixture to form a combined mixture; heating the combined mixture to form a third mixture comprised of a mixture of thermoplastic resins comprised of a first product resin formed from the first intermediate product resin, and added the second monomer and a second product resin formed from the second monomer; cooling the third mixture; optionally isolating the mixture of thermoplastic product resins from the third mixture; and optionally washing and drying the mixture of thermoplastic resins, and wherein the first product resin and the second product resin each possess a narrow polydispersity and the mixture of thermoplastic resins possesses a modality of, for example, equal to 2. Higher modalities, for example, of from 3 to about 20 may be conveniently achieved if desired by the subsequent addition of fresh mixtures of monomer, free radical initiator, metal stable free radical complex, and stable free radical agent prior to the final cooling and isolation.

In embodiments of the present invention there is provided an accelerated free radical polymerization process for the preparation of a block copolymer thermoplastic resin or resins comprising heating a first mixture comprised of a free radical initiator, a metal stable free radical complex catalyst, especially the complex comprised of TEMPO and a metal, and more specifically, wherein the metal is known, such as a bare metal like zinc, and the metal complex refers, for example, to a metal bound by organic groups rendering the complex more soluble in solution, a stable free radical agent, and at least one polymerizable monomer compound to form a first intermediate product resin; cooling the first mixture; isolating the first intermediate product resin; adding to the first intermediate product resin a second mixture comprised of at least one polymerizable monomer compound, wherein the polymerizable monomer compound of the second mixture is different from the polymerizable monomer compound of the first mixture, to form a combined mixture; heating the combined mixture to form a third mixture comprised of a block copolymer thermoplastic resin comprised of a first product resin formed from the first intermediate product resin and added the second monomer; cooling the third mixture; optionally isolating the block copolymer thermoplastic resin from the third mixture; and optionally washing and drying the block copolymer thermoplastic resin, and wherein the block copolymer possesses a narrow polydispersity. The isolation of the intermediate product resin is preferred when high purity and block integrity or homogeneity is desired, that is residual unreacted monomer or monomers of the first mixture may subsequently react with and be integrated into the growing polymer chain formed from the second mixture of polymerizable monomer compounds. Thus, in preparing block copolymers by processes of the present invention isolation by, for example, precipitation of the intermediate products of the polymerization reactions is preferred when high purity is desired or when the degree of polymerization is less than about 70 to 90 percent for a block or multiblock polymerization reaction.

The process of the invention can comprise a free radical polymerization process for the preparation of a thermoplastic resin comprising heating for an effective period a water suspension mixture of a peroxide free radical initiator, a nitroxide stable free radical agent, a metal stable free radical complex catalyst, and at least one and preferably one polymerizable monomer compound, for example 1 to 3 and most preferably one, to form the thermoplastic resin with a high monomer to polymer conversion; cooling the mixture; isolating the thermoplastic resin; and optionally washing and drying the thermoplastic resin, and wherein the thermoplastic resin possesses a narrow polydispersity of about 1.1 to about 1.5. The polymer or copolymer resin compositions obtained possess, for example, a weight average molecular weight ($M_w$) of from about 10,000 to 500,000, and preferably from about 10,000 to about 300,000, and a number average molecular weight ($M_n$) of from about 9,000 to about 200,000, and a polydispersity of about 1.1 to about 2.0, and preferably an even narrow polydispersity of from about 1.15 to about 1.5.

Although not being desired to be limited by theory, it is believed that when the polymerization reaction processes of the present invention are performed at a temperature at about or above 100° C., the exact temperature depending on the initiator used, all the polymer chains are expected to be initiated at about the same time which is a primary reason for enabling forming polymer chain products having narrow polydispersities. The temperature accordingly is preferably from about 100° to about 165° C., and more preferably from about 120° to about 1400° C., however, the temperature may be lower.

The aforementioned undesirable chain coupling or disproportionation termination reactions, so prevalent under the conditions of many of the prior art free radical polymerization systems, such as anionic, is suppressed under the conditions of the present invention primarily because the effective concentration and availability of living free chains is extremely small. In addition, stable free radical agents of the present invention do not initiate polymerization so that new chains are not initiated after an initial period during which all polymer chains are initiated at about the same time. Moreover, and importantly with the use of the metal stable free radical agent complexes other advantages are achievable as indicated herein, including acceleration of the process, for example excellent polymer $M_n$ of from about 400 to about 17,000 can be obtained in a time period, respectively, of from about 1 hour to about 4 hours, a very rapid time, and wherein superior narrow polymer product polydispersities are achieved, and wherein conversions from monomer to polymer is greater than 90 percent in less than about 4 hours. The accelerating reaction can be accomplished by the addition of the metal complex prior to, after, or prior to and after the initiation of the polymerization. Other specific advantages include optionally providing TEMPO or TEMPO derivatives in a prebound form, where one or more dative (weak metal TEMPO bonds) metal or metal complex TEMPO species bonds are generated from the coordination of either the nitroxyl group of the TEMPO derivative or the functional groups of the TEMPO species are possible, thus reducing the degree of reversible capping at living ends and providing an appropriate concentration of TEMPO or metal-TEMPO species to the living ends of the polymer to effect a linear rate enhancement and to avoid other undesirable reactions, such as protonation of the nitroxyl group, that would consume the TEMPO species Scheme 1

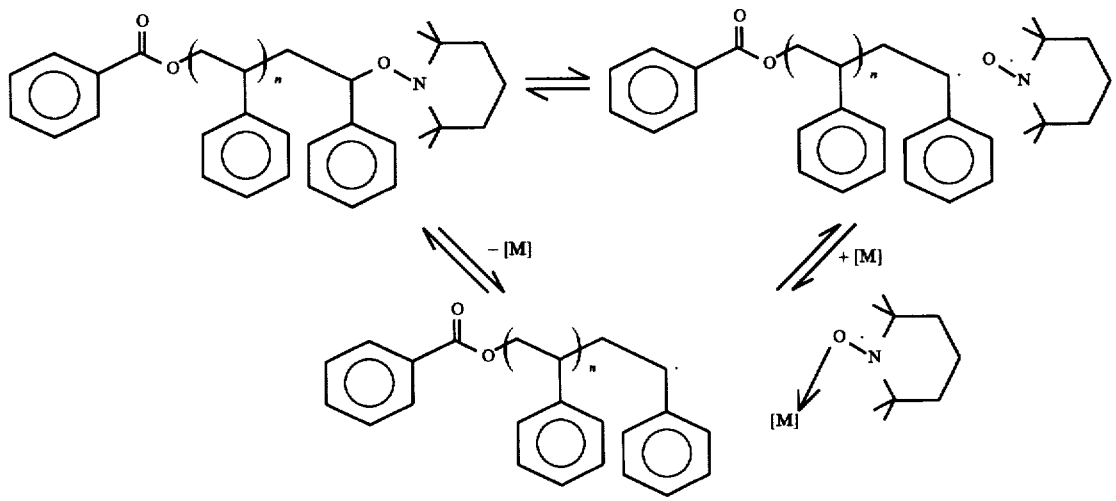

wherein M is a metal and n represents the number of segments.

Propagating chains of the present invention are referred to as pseudoliving primarily because the stable free radical agent either directly coordinated to the metal or thermally detached from adds to a propagating chain and the chain is temporarily, but reversibly, terminated. As shown in Scheme 1, the propagating polymer chain fluctuates or is in an equilibrium condition between being temporarily terminated or suspended, and being alive or living. As thermal energy is supplied from the reaction system to the bond joining the growing polymeric chain and the stable free radical (SFR) agent, that is the adduct in the accompanying Scheme where, for example, the SFR agent is covalently bound to the propagating chain, for example a substituted styrene, homolytically cleaves thereby temporarily generating a living chain end radical species shown in square brackets [Styrene/SFR] permitting another monomer unit to insert or add to the chain and is again instantaneously, although short lived as determined by diffusion control, terminated or protected by the SFR agent as a thermally labile adduct above about 80° C. to about 100° C. or latent free radical chain. The metal or metal complex denoted [M] reversibly coordinates to TEMPO during the polymerization, controlling the effective metal TEMPO concentration and accelerating the observable polymerization rate. The free radical initiator, for example benzoyl peroxide, can be represented as INIT. The term "protected" refers, for example, to the chain radical species being available for selective rather than indiscriminate further reaction with monomer. An unmoderated free radical polymerization chain, that is, a free radical polymerization process without a stable free radical agent present in contrast has a reactive or "open" chain end throughout the reaction.

Processes of the present invention further comprises in embodiments a method for sequentially repeating the monomer addition or polymerization and with additional stable free radical, metal stable free radical complex or catalyst, and free radical initiator of the process being added, N times, to provide a well defined mixture of thermoplastic resins wherein each resin in the mixture is comprised of polymers having discrete and narrow polydispersities and wherein the mixture has a modality equal to N+1 wherein N is the number of times the addition step of initiator, stable free radical agent and monomer is repeated.

The present invention provides several specific advantages in embodiments as follows: polymer product polydispersities can be varied from between approximately 1.05 to approximately 2.0, and preferably from about 1.05 to about 1.4 depending on the monomer/comonomer system by varying the ratio of stable free radical agent to free radical initiator molar concentration; the process is accelerated, for example it can be from 15 to about 200 times as rapid as compared to prior art processes wherein the transition metal complex catalyst was not selected, and narrow, for example from about 1.05 to about 1.4, polydispersity can be consistently obtained, and wherein the metal stable free radical complex can be selected as a stable free radical source.

The stable free radical agent moderated polymerization reactions may be performed in a variety of media, for example suspension, emulsion, bulk, that is neat or without solvent, or in aqueous or nonaqueous solution, using preferably higher boiling solvents, such as toluene and xylene.

During the reaction of monomer or mixed monomers to form polymers, the accelerated reaction time may be varied over an effective period of from about 1 to about 10 hours, preferably between about 2 to 5 hours and optimally about 4 hours. The optimal reaction time may vary depending upon the temperature, the volume and scale of the reaction, the quantity and type of polymerization initiator and the metal stable free radical agent selected. The polymerization reaction temperature is retained relatively constant throughout the heating step by providing an adjustable external heat source, and this temperature is from about 95° C. to about 165° C., and preferably between about 120° C. and about 160° C. and optimally in embodiments about 120° C. to about 140° C. Reactions performed above 165° C. tend to result in a broadening of the polydispersity. A reaction volume may be selected of any size that enables simple adding, mixing, reacting and isolating the product resins on an economic or convenient scale.

The free radical initiator can be any free radical polymerization initiator capable of initiating polymerization, such as azo initiators such as azobisisobutyronitrile, organic peroxides, especially benzoyl peroxide, and the like including the free radical initiators disclosed in the patents and pending applications mentioned herein. The free radical initiator concentration selected is from about 0.2 to about 2.5 weight percent of the total weight of monomer to be polymerized and is determined by the desired molecular weight of the polymer or resin product. As the initiator concentration is decreased relative to the weight of molar equivalents of monomer used, the molecular weight of the thermoplastic resin product increases.

The stable free radical agent can be any stable free radical and includes nitroxide free radicals, for example PROXYL (2,2 5,5-tetramethyl-1-pyrrolidinyloxy) and derivatives thereof, and preferably TEMPO (2,2,6,6-tetramethyl-1-piperidinyloxy), derivatives thereof, and the like, reference the pending applications and patents mentioned herein. These stable free radical agents are known in the literature, for example G. Moad et. al., *Tetrahedron Letters*, 22, 1165 (1981) as free radical polymerization inhibitors. Under the polymerization conditions of the present invention, stable free radical agents can function as moderators to harness the normally highly reactive and indiscriminate intermediate free radical species.

The molar ratio of the stable free radical (SFR) agent to free radical initiator (INIT) is, for example, from about 0.4 to 2.5, and preferably in the range from about 0.9 to 1.6. Although not being desired to be limited by theory, in an embodiment, the molar ratio [SFR/INIT] of stable free radical agent, for example TEMPO, to free radical initiator, for example benzoyl peroxide, of about 1.3 is believed to be important. When styrene is polymerized to polystyrene without the stable free radical agent of the invention process, the product polymers isolated have polydispersities of 2.0 and above.

In embodiments, the molar ratio of monomer content to stable free radical agent to free radical initiator is, for example, from about 100:0.2:1 to about 10,000:2.5:1 and preferably in the range of from about 300:1.3:1 to about 7,000:1.3:1.

Examples of metal compound catalysts, and metal complex catalysts are, for example, as illustrated herein and are selected in effective amounts, such as from about 1 to about 200 weight percent and preferably from about 60 to about 90 weight percent, and wherein the mole ratio of stable free radical agent to free radical initiator to metal complex is, for example, from about 1.0/1.3/0.25. Specific examples of metal complexes include stable free radical agent complexes with the stable free radical agent as illustrated herein, and a main group, transition, lanthanide or rare earth metal, for example a metal of chromium, copper, cobalt, nickel or zinc, scandium and the like, and which metal complex can be represented by the following formula $M(RR')_n$ TEMPO, (TEMPO is the stable free radical agent as indicated herein, that is 2,2,6,6,-tetramethyl-1-piperidinyloxy, however other similar stable free radical agents can be selected in place of the TEMPO) or $M(RR')_nZ$, wherein M is a metal, and R and R' are any of hydrogen, a Group V element or bridging complex containing N, P and the like, or a Group VI element or bridging complex containing O,S, Se and the like, aryl, alkyl, or halide and the like, Z is the stable free radical agent, such as TEMPO, and n represents the number of (RR')s and is, for example, a number of from 1 to about 6. Alkyl can contain from 1 to about 25, and preferably from 1 to about 10 carbon atoms such as methyl, ethyl, propyl, butyl, pentyl, hexyl, octyl, nonyl, and the like. Aryl can contain from 6 to about 30, and preferably from 6 to about 24 carbon atoms such as phenyl benzyl, naphthyl, and the like. Halides include fluoride, bromide, iodide, and chloride. In embodiments, the metal may be a rare earth metal such as La, Eu, Pr, Nd, and the like. Metal compound catalysts are preferred, such as those catalysts wherein no TEMPO or Z is present, that is metal catalysts compounds of the formula $M(RR')_n$, wherein M, R, R', and n are as illustrated herein.

The structure of the metal stable free radical complex catalyst or metal complex catalyst with TEMPO can be of the form where the metal is bound to the TEMPO through either covalent or associative bonds. For example, the TEMPO derivative, 4-hydroxyTEMPO, coordinates to a metal or metal complex, such as Copper (II) acetoacetylnoate $(Cu(acac)_2)$, via an oxygen metal covalent bond. Alternatively, there can be selected a metal TEMPO complex where the nitroxyl group of the TEMPO derivative is physically bound by either weak covalent or ionic bonds. In the formulas, R is either hydrogen, alkyl or aryl, a halide, an amine, an alkoxide or hydroxide derivative, and M is either a transition metal, or rare earth metal complex.

Specific examples of preferred metal complex catalysts include hexafluoroacetylacetonate/4-hydroxyTEMPO, zinc acetylacetonate/4-hydroxyTEMPO, copper hexafluoroacetylacetonate/TEMPO, copper acetylacetonate/TEMPO, copper hexafluoroacetylacetonate/4-hydroxyTEMPO, magnesium hexafluoroacetylacetonate/TEMPO, magnesium hexafluoroacetylacetonate/4-hydroxyTEMPO, nickel hexafluoroacetyl acetonate/TEMPO, nickel hexafluoroacetylacetonate/4-hydroxyTEMPO, cobalt hexafluoroacetylacetonate/TEMPO, cobalt hexafluoroacetylacetonate/4-hydroxyTEMPO, ytterbium hexafluoroacetylacetonate/TEMPO, ytterbium hexafluoroacetylacetonate/4-hydroxyTEMPO, lanthanide hexafluoroacetylacetonate/TEMPO, scandium hexafluoroacetylacetonate/TEMPO, and the like.

Examples of metal catalyst compounds include zinc dichloride, zinc hexafluoroacetylacetonate dihydrate, cobalt hexafluoroacetylacetonate monohydrate, magnesium hexafluoroacetylacetonate dioxane, ytterbium tris (hexafluroacetylacetonate), nickel hexafluoroacetylacetonate dihydrate, and scandium hexafluoroacetylacetonate selected in various effective amounts, such as for example from about 1 to about 3 weight percent based on the amount of catalyst and monomer, or monomers.

The monomers that can be selected include substantially any monomer capable of undergoing a free radical polymerization and include, but are not limited to styrene, substituted styrenes and derivatives thereof, for example methylstyrene, acrylates, methacrylates, butadiene and any conjugated diene monomer sufficiently reactive under the specified stable free radical moderated polymerization reaction conditions to afford a stable free radical reaction adduct and high molecular weight polymer product, for example isoprene and myrcene. Specific monomers include styrene, chloromethylstyrene, butylacrylate, butylmethacrylate, and butadiene.

The stable free radical moderated polymerization process of the present invention may be repeated a number of times within the same reaction vessel by the delayed and stepwise addition of more monomer or monomers with varying amounts of initiator, transition metal, and stable free radical agent to form a mixture of monomodal resins where each component has a distinct molecular weight and has a narrow molecular weight distribution, and wherein the mixture has a modality of N+1, where N represents the number of additional times that monomer, initiator and stable free radical agent are added.

By cooling the polymerization reaction to below 60° to 80° C., the stable free radical moderated reaction is effectively quenched or terminated. Each new or subsequent addition of monomer, stable free radical, transition metal, and initiator accompanied by heating provides a new polymeric species having a narrow molecular weight distribution, and each new polymer species continues to grow independent of the other polymer species already established.

Alternatively, block copolymer resins may also be prepared whereby after each desired block has been formed a new monomer or monomers is added without the addition of more initiator, transition metal, or stable free radical agent to form a new block wherein each block component is well defined in length and has a narrow molecular weight distribution, and having properties depending on the repeated sequence and the monomers chosen for incorporation.

Additional optional known additives may be selected for polymerization reactions and which additives may provide additional performance enhancements to the resulting product, for example colorants, lubricants, release or transfer agents, surfactants, stabilizers, antifoams, and the like.

Polymer resins possessing discrete mixture of monomodal, that is a well defined multimodal molecular weight distribution in embodiments thereof provide several advantages, particularly for electrophotographic toner compositions, such as: melt rheology properties including improved flow and elasticity, and improved performance properties such as triboelectrification, admix rates and shelf life stabilities.

The processes of the present invention can be selected to form a wide variety of polymers. For example, the processes can be selected to polymerize a styrene monomer to form polystyrene or butadiene to form polybutadiene. The process of the present invention can be selected to polymerize a mixture of two or more different polymerizable monomers to form copolymers therefrom, for example polymerization of styrene and butadiene to form poly(styrene-butadiene), styrene and isoprene to form poly(styrene-isoprene), styrene and acrylate to form poly(styrene-acrylate), styrene and methyl methacrylate to form poly(styrene-methyl methacrylate), and the like, and combinations thereof, including copolymers and terpolymers.

A plot of weight percent monomer conversion versus number average molecular, which illustrates, for example, that the metal acts as an accelerant with respect to a control, indicates that a nearly linear relationship is present for the bulk polymerization and other aforementioned reaction media using stable free radical agent moderated processes of the present invention. For example, at 20 percent conversion the number average molecular weight of the polystyrene polymer product is about 4,000 and at 65 percent conversion the number average molecular weight is about 10,000.

In embodiments, there can be incorporated into the monomer a waxy component, such as alkylenes, like polyethylene, polypropylene waxes, and mixtures thereof having a low molecular weight of from between about 1,000 to about 20,000. The use of such a component may be desirable for certain toner applications. Suitable low molecular weight waxes are disclosed in U.S. Pat. No. 4,659,641, the disclosure of which is totally incorporated herein by reference.

Disclosed is a free radical polymerization process for the preparation of a polymer comprising heating a mixture of a free radical initiator, a stable free radical agent, a metal catalyst compound, or a metal stable free radical complex catalyst, and at least one polymerizable monomer; cooling the mixture; and optionally isolating the polymer; an accelerated free radical polymerization process for the preparation of thermoplastic resins, which process comprises heating a mixture of a free radical initiator, a metal catalyst compound, or a metal stable free radical complex, and at least one polymerizable monomer compound to form the thermoplastic resin; cooling the mixture; isolating the thermoplastic resin; and optionally washing and drying the thermoplastic resin; an accelerated free radical polymerization process wherein there is further included in the reaction mixture a stable free radical agent; a process wherein there is formed a thermoplastic resin with a high monomer to polymer conversion; a process wherein the high is, for example, at least 90 percent; a process wherein at least one is from 1 to about 5 monomers; a process wherein at least one is one; a process wherein the heating is from about 100° to about 165° C.; a process wherein the heating is from about 120° to about 140° C.; a process wherein subsequent to isolating the resin is subjected to washing and drying; a process wherein cooling is from about 20° to about 40° C.; a process wherein the reaction is accomplished in a period of time of from about 2 to about 4 hours; a process wherein the polymer possesses a narrow polydispersity; a process wherein the polymer possesses a narrow polydispersity, of from about 1.1 to about 1.5, and an $M_n$ of from about 2,000 to about 18,000; a process wherein the monomer is styrene; a process wherein the metal catalyst compound is of the formula $M(RR')_n$ wherein M is a metal, and R and R' are hydrogen, a single or doubly bridging ligand complex containing either a Group III, Group IV, Group V or Group VI element, and n is a number of, for example, from 1 to about 6, and Z is as indicated herein and can be a ligand; a process wherein the Group III elements are B, or Al, the Group IV elements are Si, Ge or Sn, the Group V elements are N, P, As, Sb, the Group VI elements are O, S, Se, Te, the Group VI elements are S, Se, or Te, and the bidentate ligands selected to form a catalyst are of type containing two oxygen bridges of acetylacetonate or hexafluoroacetylacetonate, two amine bridges of diethylene diamine or two phosphine bridges of bis(diphenylphosphino) ethane; a process wherein the metal is chromium, copper, cobalt, nickel, nickel, magnesium, scandium, or ytterbium; a process wherein the metal catalyst compound is of the formula $M(RR')_nZ$ wherein M is a rare earth metal, or a transition metal of Cu, Zn, Y, Ni, or Co, and R and R' are as indicated herein, and more specifically, hydrogen, aryl, alkyl, alkyoxy, a bidentate ligand, or a halide, and n and Z are as illustrated herein; a process wherein the metal M is a rare earth metal of La, Eu, Pr, or Nd; a process wherein the metal catalyst compound is selected from the group consisting of zinc dichloride, zinc hexafluoroacetylacetonate dihydrate, cobalt hexafluoroacetylacetonate monohydrate, magnesium hexafluoroacetylacetonate dioxane, ytterbium tris (hexafluoroacetylacetonate), nickel hexafluoroacetylacetonate dihydrate, and scandium hexafluoroacetylacetonate, optionally selected in an amount of from about 1 to about 3 weight percent based on the amount of said metal complex and said monomer; a process wherein the heating is conducted in a solvent or diluent, the heating is conducted neat, or wherein the heating is conducted as a suspension in water or in a polar liquid which is not miscible with said monomer; a process wherein the free radical initiator is selected from the group consisting of organic peroxides, azobisalkylnitriles, peroxycarbonates, and mixtures thereof; a process wherein the stable free radical agent is a nitroxide stable free radical; a process wherein the stable free radical agent is a nitroxide stable free radical selected from the group consisting of 2,2,5,5-tetramethyl-1-pyrrolidinyloxy, 2,2,6,6-tetramethyl-1-piperidinyloxy, and mixtures thereof; a process wherein the stable free radical agent to free radical initiator molar ratio is from about 0.4 to about 2.5; a process wherein the stable free radical agent to free radical initiator molar ratio is from about 0.9 to about 1.8, and the monomer to free radical initiator molar ratio is from about 100:1 to about 10,000:1; a process wherein the monomer is selected from the group consisting of styrenes, conjugated dienes, acrylates, methacrylates, and mixtures thereof; a process wherein said polymer is a thermoplastic resin with a gel content of from 0.0 to about 0.4 weight percent; a process wherein the weight average molecular weight ($M_w$) of the polymer is from 2,000 to 300,000; a process wherein the heating is from about 120° to about 160° C., and wherein the polymeric chains of the polymer are formed simultaneously at from about 0 to 10 minutes after the heating temperature has attained about 100° C.; a process further comprising adding a tertiary amine promoter compound to the reaction mixture thereby increasing the rate of dissociation of the free radical initiator, and where the free radical initiator is an organic peroxide, and wherein the polymer has a polydispersity of from about 1.1 to about 2.0 and the monomer to polymer conversion is from about 50 to about 90 percent; a process wherein the heating is for an effective time period, and there is heated a water suspension mixture of a peroxide free radical initiator, a nitroxide stable free radical agent, a metal stable free radical catalyst, and at least one polymerizable monomer compound to form the thermoplastic resin or resins with a high monomer to polymer conversion; cooling the mixture; isolating the thermoplastic resin; and washing and drying the thermoplastic resin, and wherein the thermoplastic resin possesses a narrow polydispersity of from about 1.1 to about 1.5 and a modality of 1; a free radical polymerization process for the preparation of thermoplastic resin comprising heating a first mixture comprised of a free radical initiator, a stable free radical agent, a metal compound catalyst, or a metal stable free radical complex catalyst, and at least one polymerizable monomer compound to form a first intermediate product resin; optionally cooling the first mixture; adding to the first intermediate product resin a second mixture comprised of a free radical initiator, a stable free radical agent, a metal stable free radical complex, and at least one polymerizable monomer compound, wherein the polymerizable monomer compound of the second mixture contains the same components as the polymerizable monomer compound of the first mixture, and the free radical initiator and the stable free radical agent of the second mixture are the same or different from the free radical initiator and the stable free radical agent of the first mixture, and wherein there is formed a combined mixture; heating the combined mixture to form a third mixture comprised of a mixture of thermoplastic resin comprised of a first product resin formed from the first intermediate product resin and added the second monomer and a second product resin formed from the second monomer; cooling the third mixture; optionally isolating the mixture of thermoplastic product resin from the third mixture; and optionally washing and drying the mixture of thermoplastic resins and wherein the first product resin and the second product resin each possess a narrow polydispersity; a free radical polymerization process wherein a block copolymer thermoplastic resin is prepared; an accelerated free radical polymerization process wherein there is prepared a multiblock copolymer thermoplastic resin comprising heating a first mixture comprised of a free radical initiator, a stable free radical agent, a metal stable free radical complex, and at least one polymerizable monomer compound to form a first intermediate product resin; optionally cooling the first mixture; optionally isolating the first intermediate product resin; adding to the first intermediate product resin a second mixture comprised of at least one polymerizable monomer compound, wherein the polymerizable monomer compound of the second mixture is different from the polymerizable monomer compound of the first mixture, to form a combined mixture; heating the combined mixture to form a third mixture comprised of a block copolymer thermoplastic resin comprised of a first product resin formed from the first intermediate product resin and added the second monomer; cooling the third mixture; optionally isolating the third mixture; sequentially repeating the preceding steps of adding, heating and cooling, N times, to form a fourth mixture containing a multiblock copolymer thermoplastic resin or resins having N+2 blocks, and wherein N is the number of times the sequence is repeated; optionally isolating the multiblock copolymer thermoplastic resin from the fourth mixture; and optionally washing and drying the multiblock copolymer thermoplastic resin, and wherein the multiblock copolymer thermoplastic resin possesses a narrow polydispersity; a process wherein N is from 1 to about 20; a process wherein the metal catalyst compound is selected in an effective amount, for example from 0.1 to about 5 parts, and wherein this catalyst is selected from the group consisting of zinc dichloride, zinc hexafluoroacetylacetonate dihydrate, cobalt hexafluoroacetylacetonate monohydrate, magnesium hexafluoroacetylacetonate dioxane, ytterbium tris(hexafluoroacetylacetonate), nickel hexafluoroacetylacetonate dihydrate, and scandium hexafluoroacetylacetonate; a process further comprising adding a tertiary amine promoter compound to the reaction mixture thereby increasing the rate of dissociation of the free radical initiator and where the free radical initiator is an organic peroxide, and wherein the polymer has a polydispersity of from about 1.1 to about 2.0 and the monomer to polymer conversion is from about 50 to about 90 percent; the metal catalyst compound is of the formula M(RR')$_n$, or the metal complex is of the formula M(RR')$_n$Z, wherein M is a metal, and R and R' are hydrogen, a single or doubly bridging ligand complex containing either a Group III, Group IV, Group V or Group VI element, Z is as illustrated herein and is preferably TEMPO, and n is a number of, for example, from 1 to about 6.

Toner compositions can be prepared by a number of known methods, such as admixing and heating thermoplastic resin or polymer particles obtained with the processes of the present invention such as styrene acrylate, styrene methacrylate, or styrene butadiene copolymers, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable thermoplastic toner resins selected for the toner and developer compositions include polyamides, styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Preferred toner resins include styrene/methacrylate copolymers, PLIOLITES®; suspension polymerized styrene butadienes, reference U.S. Pat. No. 4,558,108, the disclosure of which is totally incorporated herein by reference.

In the toner compositions, the resin is present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

A number of known suitable pigments or dyes can be selected as the colorant for the toner including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides (FeO.Fe$_2$O$_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions external additive particles including flow aid additives, which additives are usually present on the surface thereof. Examples of these additives include colloidal silicas, especially fumed silicas, such as AEROSIL®, metal salts and metal salts of fatty acids inclusive of zinc stearate, aluminum oxides, titanium oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,900,588, the disclosures of which are totally incorporated herein by reference.

With further respect to the toners, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent. Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight, $M_w$, of from about 1,000 to about 1,500, while the commercially available polypropylenes utilized for the toner compositions are believed to have a molecular weight, $M_w$, of from about 4,000 to about 10,000. Many of the polyethylene and polypropylene compositions are illustrated in British Patent No. 1,442,835, the disclosure of which is totally incorporated herein by reference.

The low molecular weight wax is present in the toner composition or the polymer resin in various amounts, however, generally these waxes are present in the toner composition in an amount of from about 1 percent by weight to about 15 percent by weight, and preferably in an amount of from about 2 percent by weight to about 10 percent by weight, and may in embodiments function as fuser roll release agents.

Colored toner and developer compositions are comprised of toner resin particles, carrier particles, charge enhancing additives, and as pigments or colorants red, blue, green, brown, magenta, cyan and/or yellow particles, as well as mixtures thereof. More specifically, with regard to the generation of color images illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts, for example these colored pigment particles are present in the toner composition in an amount of from about 2 percent by weight to about 15 percent by weight calculated on the weight of the toner resin particles.

Examples of color toners are as illustrated, for example, in U.S. Pat. No. 5,556,727, the disclosure of which is totally incorporated herein by reference.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments from about 90 to about 175 microns thereby permitting them to possess sufficient density and inertia to avoid adherence to the electrostatic images during the development process. The carrier component can be mixed with the toner composition in various suitable combinations, for example about 1 to 5 parts per toner to about 10 parts to about 200 parts by weight of carrier are selected.

The toner composition can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners is preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

The following Examples are being provided to further define various species of the present invention, it being noted that these Examples are intended to illustrate and not limit the scope of the present invention. Parts and percentages are by weight unless otherwise indicated. Comparative Examples and data are also provided.

Catalysts

The TEMPO complexes can in some instances, it is believed, be isolated from the direct reaction of the TEMPO derivative with the metal complex in polar solvents at room or refluxing temperature, and isolated by filtration under argon as moisture sensitive species. Examples of isolated metal TEMPO complexes include, it is believed, Cu(hfac)$_2$TEMPO, or Zn(hfac)$_2$TEMPO. Alternatively, the metal TEMPO complexes can be generated in situ.

In all of the Examples that follow, except for the Comparative Example, the metal catalysts were generated in situ.

EXAMPLE I

Bulk Free Radical Polymerization With a Zn(hfac)$_2$ Catalyst to Form Narrowly Dispersed Polystyrene To two round bottom flasks under Ar (argon) equal halves of a mixture of TEMPO (165 milligrams) and benzoyl peroxide (199 milligrams) in 21.9 milliliters of styrene were added. The reaction mixtures were heated to 135° C. while being stirred. The initially clear orange solutions turned light yellow. After 5 minutes, (zinc hexafluoro acetate) Zn(hfac)$_2$.2H$_2$O (136 milligrams) was dumped into one flask (A) to provide a clear yellow solution. The other flask (B) was the control.

Samples (100 milligrams) were taken at intervals and analyzed by GPC before precipitation; the times and GPC data are given in Table 1. Percent conversion after 5 hours was determined by TGA to be 68 percent and 36 percent for the sample containing Zn(hfac)$_2$ and the control, respectively. In this Example and all subsequent Examples, except as otherwise noted, the polymeric mixtures, for example white colorless polystyrene, were first dissolved in a minimum amount of dichloromethane and precipitated from methanol, isolated by filtration, and dried in a vacuum oven to yield the styrene polymer product.

TABLE 1

| Sample | Reaction Time (Minutes) | M$_n$ | M$_w$ | MP | Polydispersity |
|---|---|---|---|---|---|
| Zn(hfac)$_2$ | 12 | 5821 | 7268 | 7361 | 1.248 |
| Control | 120 | 1993 | 2339 | 2326 | 1.173 |
| Zn(hfac)$_2$ | 180 | 8148 | 10261 | 10518 | 1.259 |
| Control | 180 | 3430 | 4176 | 4088 | 1.217 |
| Zn(hfac)$_2$ | 240 | 10990 | 13856 | 14387 | 1.261 |

TABLE 1-continued

| Sample | Reaction Time (Minutes) | M$_n$ | M$_w$ | MP | Polydispersity |
|---|---|---|---|---|---|
| Control | 240 | 5130 | 6214 | 6208 | 1.211 |
| Zn(hfac)$_2$ | 300 | 11947 | 16115 | 17021 | 1.349 |
| Control | 300 | 6315 | 7759 | 7816 | 1.229 |

EXAMPLE II

Bulk Free Radical Polymerization With Benzoic Acid and a Zn(hfac)$_2$.2H$_2$O Catalyst to Form Narrowly Dispersed Polystyrene To two round bottom flasks under Ar (Argon), one of which contained 140 milligrams of Zn(hfac)$_2$.2H$_2$O, equal halves of a mixture of 4-hydroxyTEMPO (372 milligrams), benzoyl peroxide (400 milligrams) and 265 milligrams of benzoic acid in 44.0 milliliters of styrene were added. The reaction mixtures were heated to 135° C. while being stirred, the zinc species dissolving upon heating. The styrene solution containing Zn(hfac)$_2$ turned yellow while the second solution in one flask without the catalyst Zn(hfac)$_2$ (control) became very pale yellow. Samples (100 milligrams) were taken at intervals and analyzed by GPC for molecular weights and GC for conversion; the data are given in Table 2. The plot of M$_n$, against percent conversion of styrene to polystyrene was linear indicating the reaction was still living. The white polystyrene product was isolated as in Example I.

TABLE 2

| Sample | Reaction Time | Percent Conversion | M$_n$ | M$_w$ | MP | Polydispersity |
|---|---|---|---|---|---|---|
| Zn(hfac)$_2$ | 90 | 29.5 | 6040 | 7650 | 7860 | 1.27 |
| Control | 90 | 9.1 | 1070 | 1140 | 823 | 1.07 |
| Zn(hfac)$_2$ | 185 | 52.0 | 11780 | 14280 | 14650 | 1.21 |
| Control | 185 | 21.3 | 2960 | 3500 | 3520 | 1.18 |
| Zn(hfac)$_2$ | 270 | 65.7 | 15170 | 18230 | 18770 | 1.20 |
| Control | 270 | 37.0 | 5930 | 6950 | 6930 | 1.17 |

EXAMPLE III

Bulk Free Radical Polymerization With a ZnCl$_2$ Catalyst to Form Narrowly Dispersed Polystyrene To two round bottom flasks under Ar, one of which contained 106 milligrams of ZnCl$_2$, equal halves of a mixture of TEMPO (165 milligrams) and benzoyl peroxide (199 milligrams) in 21.9 milliliters of styrene were added. The reaction mixtures were heated to 135° C. while being stirred, the zinc species dissolving upon heating. The styrene solution containing ZnCl$_2$ remained orange while the second control with no catalyst became light yellow. Samples (100 milligrams) were taken at intervals and analyzed by GPC; the times and GPC data are provided in Table 2. Percent conversion after 6 hours was determined by TGA to be 75 percent and 20 percent for the sample containing ZnCl$_2$ and the control, respectively. White, moderate molecular weight polystyrene was isolated as in Example I.

TABLE 3

| Sample | Reaction Time (Minutes) | $M_n$ | $M_w$ | MP | Poly-dispersity |
|---|---|---|---|---|---|
| $ZnCl_2$ | 180 | 4864 | 7084 | 7136 | 1.456 |
| Control | 180 | 1294 | 1449 | 1280 | 1.120 |
| $ZnCl_2$ | 240 | 9063 | 12169 | 12306 | 1.343 |
| Control | 240 | 1838 | 2160 | 2088 | 1.175 |
| $ZnCl_2$ | 300 | 13521 | 17489 | 17766 | 1.296 |
| Control | 300 | 2744 | 3269 | 3264 | 1.191 |
| $ZnCl_2$ | 360 | 16812 | 22034 | 22907 | 1.311 |
| Control | 360 | 3642 | 4396 | 4365 | 1.207 |

EXAMPLE IV

Copolymer Synthesis via Bulk Free Radical Polymerization With a $ZnCl_2$ Catalyst to Form a Narrowly Dispersed Polystyrene/Butylacrylate Copolymer In a beaker, 33.5 milliliters of styrene, 20.5 milliliters of butylacrylate, 0.369 gram of TEMPO, and 0.399 gram of BPO (benzoyl peroxide) were mixed. In a flask under Argon, 22.00 milliliters of the styrene butylacrylate mixture and 0.094 gram of $ZnCl_2$ were heated to 135° C. to give a light yellow solution. Samples (100 milligrams) were taken at intervals and analyzed by GPC. The data resulting are provided in Table 4.

Control Without A $ZnCl_2$ Metal Catalyst

In another flask under Argon, 22.0 milliliters of the above styrene/butylacrylate mixture were heated to 135° C. Samples (100 milligrams) were taken at intervals and analyzed by GPC. Data are given in Table 4. The product, a white styrene/butylmethacrylate copolymer, was isolated as in Example I.

TABLE 4

| Sample | Reaction Time Minutes | $M_n$ | $M_w$ | MP | Poly-dispersity |
|---|---|---|---|---|---|
| $ZnCl_2$ | 120 | 6554 | 8838 | 9214 | 1.35 |
| Control | 120 | 1431 | 1621 | 1576 | 1.13 |
| $ZnCl_2$ | 180 | 11129 | 15112 | 16231 | 1.36 |
| Control | 180 | 2187 | 2579 | 2624 | 1.18 |
| $ZnCl_2$ | 240 | 15461 | 20223 | 21444 | 1.31 |
| Control | 240 | 3079 | 3078 | 3932 | 1.20 |

EXAMPLE V

Bulk Free Radical Polymerization With a Cobalt Catalyst to Form a Narrowly Dispersed Polystyrene In a beaker, 44 milliliters of styrene, 0.379 gram of 4-hydroxyTEMPO, and 0.399 gram of BPO were mixed. In a flask under Argon, 22.00 milliliters of the styrene mixture and 0.300 gram of $Co(hfac)_2 \cdot H_2O$ were heated to 135° C. to give a dark brown solution. Samples (100 milligrams) were taken at intervals and analyzed by GPC. The data resulting are provided in Table 5.

Control Without Metal Catalyst

In a flask under Argon, 22.00 milliliters of the above styrene reaction mixture were heated to 135° C. to give almost colorless solution. Samples (100 milligrams) were taken at intervals and analyzed by GPC. The polystyrene polymer was isolated as in Example I. The data resulting are provided in Table 5.

TABLE 5

| Sample | Reaction Time Minutes | $M_n$ | $M_w$ | MP | Poly-dispersity |
|---|---|---|---|---|---|
| $Co(hfac)_2H_2O$ | 105 | <1000 | <1000 | — | — |
| Control | 105 | 1517 | 1761 | 1643 | 1.16 |
| $Co(hfac)_2H_2O$ | 180 | 3974 | 5315 | 5319 | 1.34 |
| Control | 180 | 5212 | 6332 | 6110 | 1.20 |
| $Co(hfac)_2H_2O$ | 270 | 17509 | 22882 | 23775 | 1.31 |
| Control | 270 | 9519 | 11311 | 11150 | 1.19 |

EXAMPLE VI

Bulk Free Radical Polymerization With a Magnesium Catalyst to Form a Narrowly Dispersed Polystyrene In a beaker, 44 milliliters of styrene, 0.372 gram of 4-hydroxyTEMPO, and 0.401 gram of BPO were mixed. In a flask under Argon, 22.00 milliliters of the styrene mixture and 0.315 gram of $Mg(hfac)_2$ dioxane were heated to 135° C. to give a yellow solution. Samples (100 milligrams) were taken at intervals and analyzed by GPC. The data resulting are provided in Table 6.

Control Without Metal Catalyst

In a flask under Argon, 22.00 milliliters of the above styrene reaction mixture with the exception that no catalyst was selected (for all the Example controls the same reaction mixture was selected except there was catalyst) were heated to 135° C. to give an almost colorless solution. Samples (100 milligrams) were taken at intervals and analyzed by GPC. The polystyrene polymer was isolated as in Example I. The data resulting are provided in Table 6.

TABLE 6

| Sample | Reaction Time Minutes | $M_n$ | $M_w$ | MP | Poly-dispersity |
|---|---|---|---|---|---|
| $Mg(hfac)_2$ dioxane | 95 | 1168 | 1271 | 1021 | 1.09 |
| Control | 95 | <1000 | <1000 | <1000 | — |
| $Mg(hfac)_2$ dioxane | 240 | 11181 | 13931 | 13866 | 1.24 |
| Control | 240 | 6880 | 8268 | 8039 | 1.20 |
| $Mg(hfac)_2$ dioxane | 330 | 16614 | 21140 | 21545 | 1.27 |
| Control | 330 | 10291 | 12499 | 12331 | 1.21 |

EXAMPLE VII

Bulk Free Radical Polymerization With a Scandium Catalyst to Form a Narrowly Dispersed Polystyrene In a beaker, 22 milliliters of styrene, 0.171 gram of TEMPO, and 0.201 gram of BPQ were mixed. In a flask under Argon, 11.00 milliliters of the styrene mixture and 0.730 gram of $Sc(hfac)_3$ were heated to 135° C. to give a pale orange solution. Samples (100 milligrams) were taken at intervals and analyzed by GPC. The data resulting are provided in Table 7. The polystyrene polymer was isolated as in Example I.

Control Without Metal Catalyst

In a flask under argon, 11.00 milliliters of the above styrene mixture of 22 milliliters of styrene, 0.171 gram of TEMPO, and 0.201 gram of BPO, were heated to 1350C to provide an almost colorless solution. Samples (100 milligrams) were taken at intervals and analyzed by GPC. The polystyrene polymer was isolated as in Example I. Data are provided in Table 7.

TABLE 7

| Sample | Reaction Time | $M_n$ | $M_w$ | MP | Polydispersity |
|---|---|---|---|---|---|
| Sc(hfac)$_3$ | 120 | 5070 | 6208 | 6287 | 1.23 |
| Control | 120 | 1656 | 1923 | 1862 | 1.16 |
| Sc(hfac)$_3$ | 180 | 6905 | 8491 | 8555 | 1.23 |
| Control | 180 | 3339 | 3986 | 4006 | 1.19 |
| Sc(hfac)$_3$ | 240 | 8393 | 10261 | 10365 | 1.22 |
| Control | 240 | 5408 | 6452 | 6429 | 1.19 |
| Sc(hfac)$_3$ | 300 | 9202 | 11437 | 11740 | 1.24 |
| Control | 300 | 7202 | 8655 | 8686 | 1.20 |

EXAMPLE VIII
Bulk Free Radical Polymerization With a Yttrium Catalyst to Form a Narrowly Dispersed Polystyrene In a beaker, 44 milliliters of styrene, 0.372 gram of 4-hydroxyTEMPO, and 0.398 gram of BPO were mixed. In a flask under Argon, 22.00 milliliters of the styrene mixture and 0.297 gram of Y(hfac)$_3$ were heated to 135° C. to give a orange solution. Samples (100 milligrams) were taken at intervals and analyzed by GPC. The data resulting are provided in Table 8.

Control Without Metal Catalyst

In a flask under Argon, 22.00 milliliters of the above styrene reaction mixture were heated to 135° C. to give an almost colorless solution. Samples (100 milligrams) were taken at intervals and analyzed by GPC. The polystyrene polymer was isolated by the procedure of Example I. Data are provided in Table 8.

TABLE 8

| Sample | Reaction Time | $M_n$ | $M_w$ | MP | Polydispersity |
|---|---|---|---|---|---|
| Y(hfac)$_3$ | 90 | 3826 | 4857 | 4984 | 1.27 |
| Control | 90 | 1147 | 1243 | 1001 | 1.08 |
| Y(hfac)$_3$ | 200 | 9189 | 11351 | 11679 | 1.23 |
| Control | 200 | 6140 | 7297 | 7295 | 1.19 |
| Y(hfac)$_3$ | 270 | 12317 | 15277 | 15860 | 1.24 |
| Control | 270 | 9208 | 10853 | 10979 | 1.18 |

EXAMPLE IX
Bulk Free Radical Polymerization With a Ni(hfac)$_2$ Catalyst to Form a Narrowly Dispersed Polystyrene In a beaker, 44 milliliters of styrene, 0.372 gram of 4-hydroxyTEMPO, and 0.398 gram of BPO were mixed. In a flask under Argon, 22.00 milliliters of the styrene mixture and 0.128 gram of Ni(hfac)$_2$.(H$_2$O)$_2$ were heated to 135° C. to give a green/yellow solution. Samples (100 milligrams) were taken at intervals and analyzed by GPC. The data resulting are provided in Table 9.

Control Without Metal

In a flask under Argon, 22.00 milliliters of the above styrene reaction mixture were heated to 135° C. to give an almost colorless solution. Samples (100 milligrams) were taken at intervals and analyzed by GPC. The data resulting are provided in Table 9.

TABLE 9

| Sample | Reaction Time | $M_n$ | $M_w$ | MP | Polydispersity |
|---|---|---|---|---|---|
| Ni(hfac)$_2$ H$_2$O)$_2$ | 180 | 1901 | 2240 | 2109 | 1.18 |
| Control | 180 | 3736 | 4446 | 4442 | 1.19 |
| Ni(hfac)$_2$ (H$_2$O)$_2$ | 240 | 5250 | 6377 | 6388 | 1.22 |
| Control | 240 | 6424 | 7523 | 7460 | 1.17 |
| Ni(hfac)$_2$ (H$_2$O)$_2$ | 300 | 8578 | 10516 | 10728 | 1.23 |
| Control | 300 | 8199 | 9797 | 9861 | 1.20 |

EXAMPLE X
Chain Extension by Bulk Free Radical Polymerization With a Zn(hfac)21/Catalyst to Form a Narrowly Dispersed Polystyrene The isolated macro initiator benzoylperoxide initiated oligomeric styrene TEMPO terminated (BOST) prepared by the reaction of styrene, benzoyl peroxide and TEMPO in an approximate (1:7:1 ratio) was utilized in the following Example.

In a beaker, 0.068 gram of BOST, 0.005 gram of TEMPO, and 18 milliliters of styrene were mixed. In a flask under Argon, 9.00 milliliters of the styrene mixture and 0.088 gram of Zn(hfac)$_2$.(H$_2$O)$_2$ were heated to 135° C. to give a pale yellow solution. Samples (100 milligrams) were taken at intervals and analyzed by GPC. The polystyrene polymer was isolated as in Example I. The resulting data are provided in Table 10.

Control Without Metal Catalyst

In a flask under Argon, 9.00 milliliters of the above styrene reaction mixture were heated to 135° C. to give an almost colorless solution. Samples (100 milligrams) were taken at intervals and analyzed by GPC. The polystyrene polymer was isolated as in Example I. The data resulting are provided in Table 10.

TABLE 10

| Sample | Reaction Time | $M_n$ | $M_w$ | MP | Polydispersity |
|---|---|---|---|---|---|
| Zn(hfac)$_2$ (H$_2$O)$_2$ | 120 | 11743 | 17728 | 19072 | 1.51 |
| Control | 120 | 4090 | 4951 | 5020 | 1.21 |
| Zn(hfac)$_2$ (H$_2$O)$_2$ | 215 | 17162 | 27301 | 30530 | 1.59 |
| Control | 215 | 7447 | 9270 | 9421 | 1.25 |

EXAMPLE XI
Magnetic Toner Preparation and Evaluation

The polystyrene resin (74 weight percent of the total mixture) obtained by the stable free radical polymerization processes of Example I may be melt extruded with 10 weight percent of REGAL330® carbon black and 16 weight percent of MAPICO BLACK® magnetite at 120° C., and the extrudate pulverized in a Waring blender and jetted to 8 micron number average sized particles.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate, the coating weight being about 0.9 percent. Cascade development may be used to develop a Xerox Model D photoreceptor using a "negative" target. The light exposure may be set between 5 and 10 seconds, and a negative bias used to dark transfer the positive toned images from the photoreceptor to paper.

Fusing evaluations may be accomplished with a Xerox 5028® soft silicone roll fuser operated at 3 inches per second.

The minimum fix and hot offset temperatures (in °F.) of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically, greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from, for example, Example XI are expected to be of excellent quality with no background deposits and of high resolution over an extended number of imaging cycles exceeding, it is believed, about 75,000 imaging cycles.

Additional toner compositions may be readily prepared by conventional means from the polymer and copolymer resins of the present invention including colored toners, single component toners, multi-component toners, toners containing special performance additives, and the like.

Other modifications of the present invention may occur to those of ordinary skill in the art based upon a review of the present application and these modifications, including equivalents thereof, are intended to be included within the scope of the present invention and the claims.

What is claimed is:

1. A free radical polymerization process for the preparation of a polymer comprising heating a mixture of a free radical initiator, a stable free radical agent, a metal catalyst, or a metal stable free radical complex catalyst, and at least one polymerizable monomer; cooling said mixture; and optionally isolating said polymer, and wherein said metal catalyst is selected from the group consisting of zinc dichlorids, zinc hexafluoroacetylacatonate dihydrate, cobalt hexafluoroacetylacetonate monohydrate, magnesium hexafluoroacetylacetonate dioxane, yttrium tris (hexafluoroacetylacetonate), nickel hexafluoroacetylacetonate dihydrate, and scandium hexafluoroacetylacetonate.

2. An accelerated free radical polymerization process for the preparation of thermoplastic resins which process comprises heating a mixture of a free radical initiator, a stable free radical agent, a metal catalyst, and at least one polymerizable monomer compound to form said thermoplastic resin: cooling said mixture, isolating said thermoplastic resin; and optionally washing and drying said thermoplastic resin, and wherein said metal catalyst is a compound of the formula M(RR')$_n$ wherein M is a metal, and R and R' are hydrogen, a single or doubly bridging ligand complex containing either a Group III, Group IV, Group V or Group VI element, and n is a number of from 1 to about 6, and wherein said metal is chromium, copper, cobalt, nickel, magnesium, scandium, or yttrium, La, Eu, Pr or Nd.

3. An accelerated free radical polymerization process in accordance with claim 2 and wherein at least one polymerizable monomer is from 1 to about 5 monomers.

4. A process in accordance with claim 2 wherein said heating is from about 100° to about 165° C., and wherein subsequent to isolating said resin is subjected to washing and drying.

5. A process in accordance with claim 2 wherein said heating is from about 120° to about 140° C.

6. A process in accordance with claim 2 wherein cooling is to from about 20° to about 40° C.

7. A process in accordance with claim 2 wherein said reaction is accomplished in a period of time of from about 2 to about 4 hours.

8. A process in accordance with claim 2 wherein said polymer possesses a narrow polydispersity of from about 1.1 to about 1.5, and an $M_n$ of from about 2,000 to about 18,000.

9. A process in accordance with claim 2 wherein said Group III elements are B or Al, said Group IV elements are Si, Ge or Sn, said Group V elements are N, P, As or Sb, said Group VI elements are O, S, Se or Te, said Group VI elements are S, Se or Te, and the ligand complex is of a type containing two oxygen bridges of acetylacetonate or hexafluroacetylacetonate, two amine bridges of diethylene diamine, or two phosphine bridges of bis (diphenylphosphino) ethane.

10. A process in accordance with claim 2 wherein the metal is chromium, copper, cobalt, nickel, magnesium, scandium, or yttrium.

11. A process in accordance with claim 2 wherein said metal catalyst compound is of the formula M(RR')$_n$ wherein M is a rare earth metal, or a transition metal of Cu, Y, Ni, or Co, and R and R' are hydrogen, aryl, alkyl, alkyoxy, a bidentate ligand, or a halide, and wherein n represents the number of FRR' groups.

12. A process for the preparation of thermoplastic resin which process comprises heating a mixture of a free radical intiator, a stable free radical agent, a metal catalyst, and at least one polymerizable monomer compound to form said thermoplastic resin; cooling said mixture; isolating said thermoplastic resin; and optionally washing and drying said thermoplastic resin, and wherein the metal catalyst is selected from the group consisting of zinc dichloride, zinc hexafluoroacetylacetonate dihydrate, cobalt hexafluoroacetylaoetonate monohydrate, magnesium hexafluoroacetyl acetonate dioxane, ytterbium tris (hexafluoroacetylacetonate), nickel hexafluoroacetylacetonate dihydrate, and scandium hexafluoroacetylacetonate.

13. A process in accordance with claim 2 wherein said free radical initiator is selected from the group consisting of organic peroxides, azobisalkylnitriles, peroxycarbonates, and mixtures thereof, and wherein the stable free radical agent is a nitroxide stable free radical.

14. A process in accordance with claim 2 wherein the stable free radical agent is a nitroxide stable free radical selected from the group of consisting of 2,2,5,5-tetramethyl-1-pyrrolidinyloxy, 2,2,6,6-tetramethyl-1-piperidinyloxy, and mixtures thereof.

15. A process in accordance with claim 2 wherein the stable free radical agent to free radical initiator molar ratio is from about 0.9 to about 1.8, and the monomer to free radical initiator molar ratio is from about 100:1 to about 10,000:1.

16. A process in accordance with claim 2 wherein the monomer is selected from the group consisting of styrenes, conjugated dienes, acrylates, methacrylates, and mixtures thereof.

17. A process in accordance with claim 2 wherein the heating is from about 120° to about 160° C., and wherein the polymeric chains of said polymer are formed simultaneously at from about 0 to 10 minutes after said heating has attained about 100° C.

18. A process in accordance with claim 2 further comprising adding a tertiary amine promoter compound to said mixture thereby increasing the rate of dissociation of said free radical initiator and where said free radical initiator is an organic peroxide, and wherein said polymer has a polydispersity of from about 1.1 to about 2.0 and the monomer to polymer conversion is from about 50 to about 90 percent.

19. A process in accordance with claim 2 wherein said heating is for an effective time period, and there is heated a water suspension mixture of a peroxide free radical initiator, a nitroxide stable free radical agent, a metal stable free radical agent and at least one polymerizable monomer compound to form said thermoplastic resin or resins with a high monomer to polymer conversion; cooling said mixture; isolating said thermoplastic resin; and washing and drying said thermoplastic resin.

20. A free radical polymerization process for the preparation of thermoplastic resin comprising heating a first mixture comprised of a free radical initiator, a stable free radical agent, a metal compound catalyst, and at least one polymerizable monomer compound to form a first intermediate product resin; optionally cooling said first mixture; adding to said first intermediate product resin a second mixture comprised of a free radical initiator, a stable free radical agent, a metal compound catalyst, and at least one polymerizable monomer compound, wherein said polymerizable monomer compound of said second mixture contains the same components as said polymerizable monomer compound of said first mixture, and said free radical initiator and said stable free radical agent of said second mixture are the same or different from said free radical initiator and said stable free radical agent of said first mixture; and wherein there is formed a combined mixture; heating said combined mixture to form a third mixture comprised of a mixture of thermoplastic resin comprised of a first product resin formed from said first intermediate product resin and added said second monomer and a second product resin formed from said second monomer; cooling said third mixture; optionally isolating said mixture of thermoplastic product resin from said third mixture; and optionally washing and drying said mixture of thermoplastic resins, and wherein said metal compound catalyst is a compound of the formula $M(RR')_n$ wherein M is a metal, and R and R' are hydrogen, a single or doubly bridging ligand complex containing either a Group III, Group IV or Group VI element, and n is a number of from 1 to about 6.

21. A process in accordance with claim 1 wherein said metal catalyst is selected from the group consisting of zinc dichloride, zinc hexafluoroacetylacetonate dihydrate, cobalt hexafluoroacetylacetonate monohydrate, magnesium hexafluoroacetylacetonate dioxane, ytterbium tris (hexafluoroacetylacetonate), nickel hexafluoroacetylacetonate dihydrate, and scandium hexafluoroacetylacetonate.

22. A process in accordance with claim 12 wherein said catalyst is zinc hexafluoroacetyl acetonate dihydrate.

* * * * *